H. M. RUSS.
ATTACHMENT FOR SWEEP RAKES.
APPLICATION FILED DEC. 5, 1917.
1,268,882.
Patented June 11, 1918.
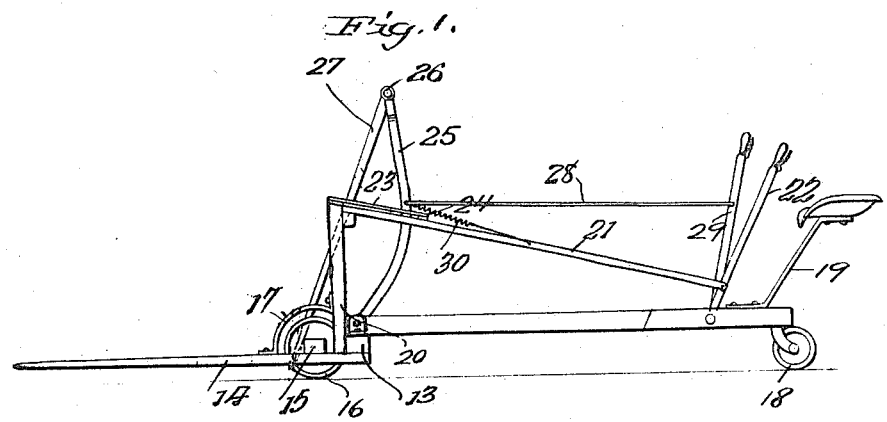
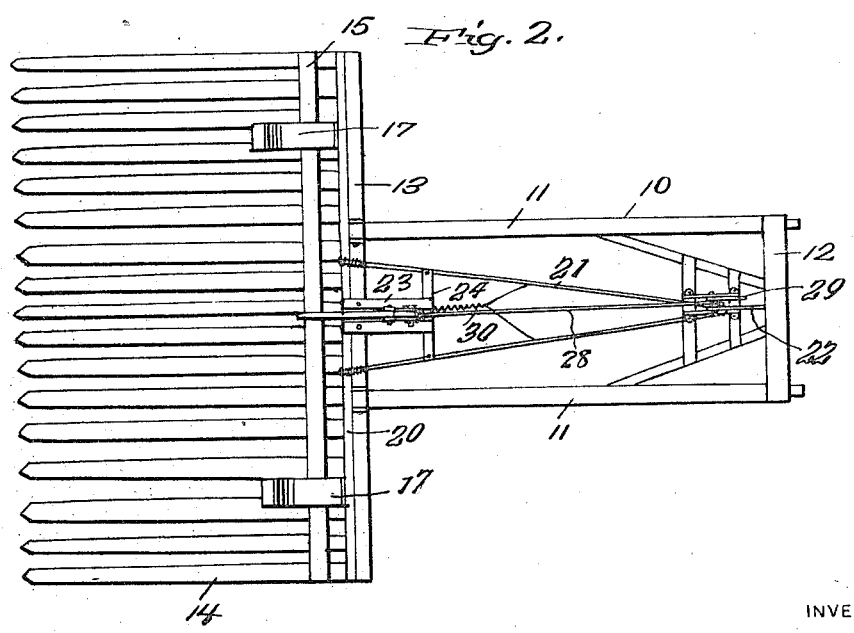
WITNESSES
INVENTOR
Henry M. Russ,
BY
ATTORNEY

UNITED STATES PATENT OFFICE.

HENRY M. RUSS, OF STOCKTON, KANSAS.

ATTACHMENT FOR SWEEP-RAKES.

1,268,882.

Specification of Letters Patent.   Patented June 11, 1918.

Application filed December 5, 1917. Serial No. 205,545.

*To all whom it may concern:*

Be it known that I, HENRY M. RUSS, a citizen of the United States, residing at Stockton, in the county of Rooks and State of Kansas, have invented certain new and useful Improvements in Attachments for Sweep-Rakes, of which the following is a specification.

This invention has relation to machine hay rakes, and has for an object to provide improvements therein whereby to discharge the hay from the fingers.

Another object of the invention is to provide improvements in hay rakes embodying a push bar mounted to move between a pair of adjacent fingers, and operable by a lever to engage the bar on the ground whereby when the rake is moved in a rearward direction the hay may be pushed from the fingers of the rake.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1, is a view in side elevation of the hay rake embodying my improvements, and Fig. 2, is a view thereof in plan.

With reference to the drawings, 10 indicates generally the frame formed of parallel longitudinally extending bars 11, connected at their rear ends by means of a cross bar 12 of a length corresponding to the distance between the bars 11 and at their forward ends pivotally connected to a cross bar 13 of a length considerably greater than the distance between the bars 11 to form a support for forwardly extending fingers 14. An axle 15 is also provided, forming a support for the forward end of the frame, the axle extending across the rear end of the fingers 14 to which axle the fingers are secured, supporting wheels 16 being mounted on the axle at points adjacent the ends thereof. Arcuate guard members 17 are mounted above the wheel to prevent the hay from becoming entangled therein. The rear end of the frame is supported upon a caster wheel 18, and a seat indicated at 19 is mounted upon the frame.

The rake also includes the vertical, standards 20 which are mounted upon the forward transverse bar 13. A pair of rearwardly converging rods 21 are connected at their forward ends to the standards 20 and at their rear ends to a hand lever 22.

My invention includes a pair of spaced guides 23, secured at their forward ends to the standards 20 and at their rear ends to a cross bar 24 which connects the rods 27. An arcuate upstanding link 25 is pivotally connected at its lower end to the cross beams 13 and extends upwardly through the guides 23 for connection at its upper end, as at 26, to a push bar 27 which extends downwardly and forwardly. Its lower end is sharpened and inserted between a pair of the rake fingers 14. A rod 28 is provided having its forward end connected to an intermediate point on the link 25, and its opposite end to a hand lever 29.

It will be noted that the normal position of the parts is such as to elevate the push bar 27 so that its lower end rests against the forward edge of the axle 15 and out of contact with the ground, the weight thereof retaining the push bar in such position. When it is impossible to unload the hay by actuation of the lever 22 in the usual manner the hay may be readily discharged by pushing forwardly upon the hand lever 29 whereby the link 27 is moved forwardly sufficiently to permit the lower end of the push bar 27 to enter between adjacent fingers 14 and engage the ground whereupon a rearward movement of the hay rake will cause the hay to be discharged from the fingers, the push bar 27 remaining stationary for a short period relative to the ground during such movement of the hay rake. If desired a spring 30 may be provided, having one end connected to the rod 28 and the other end to the frame of the machine to return the parts to normal position when the hand lever is released.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

In a hay loader, the combination of a frame, rake teeth pivotally mounted on the frame, a vertically extending curved arm pivotally connected at its lower end upon the frame and having its opposite end directed forwardly, a push bar pivotally connected at one end to the upper end of said arm and having its lower end sharpened and depending between the teeth of the hay loader, a hand lever mounted upon the frame, and a link connecting said lever with the curved arm.

In testimony whereof I affix my signature in presence of two witnesses.

HENRY M. RUSS.

Witnesses:
S. J. COOLBAUGH,
C. W. COOLBAUGH.